UNITED STATES PATENT OFFICE.

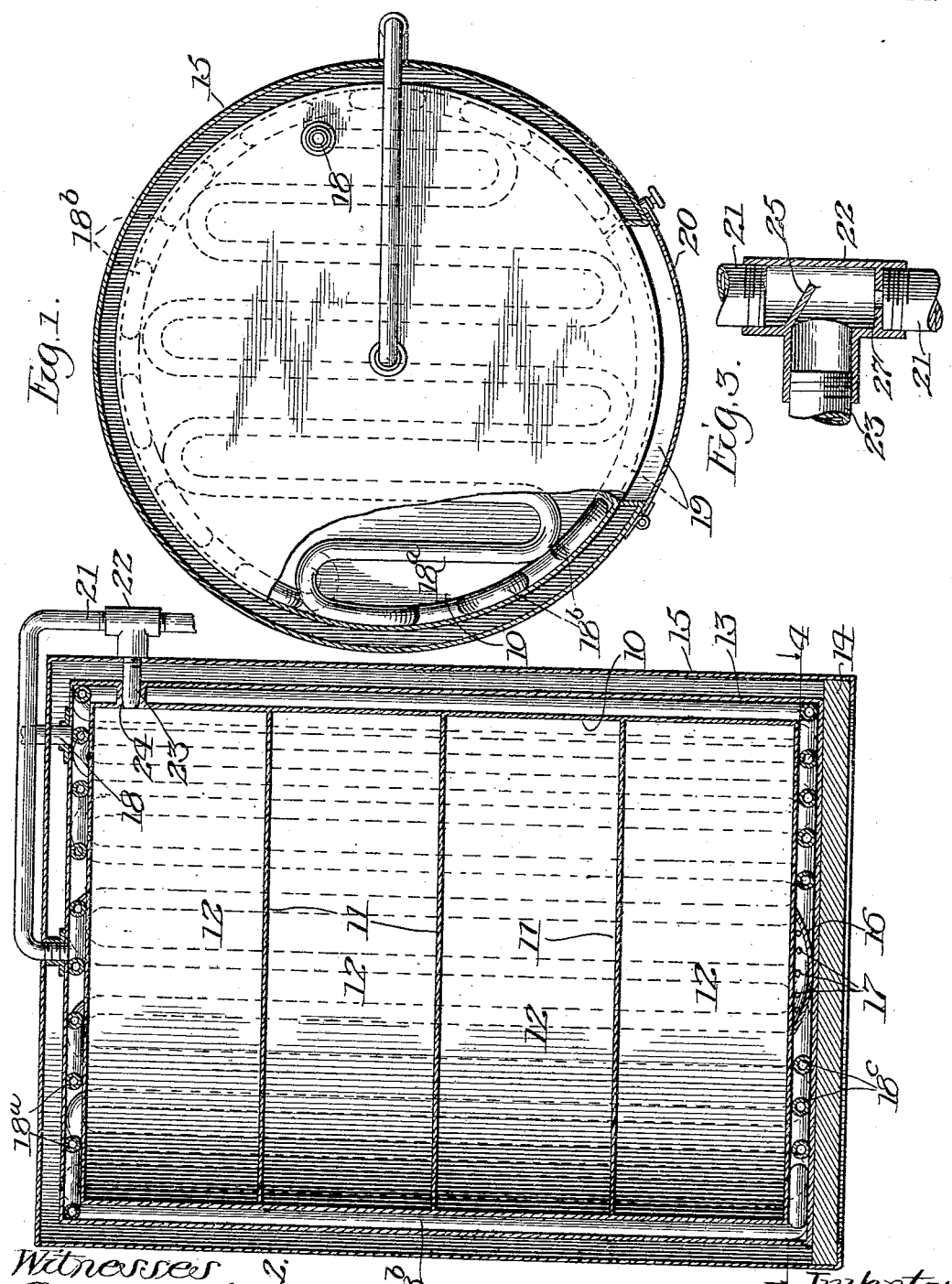

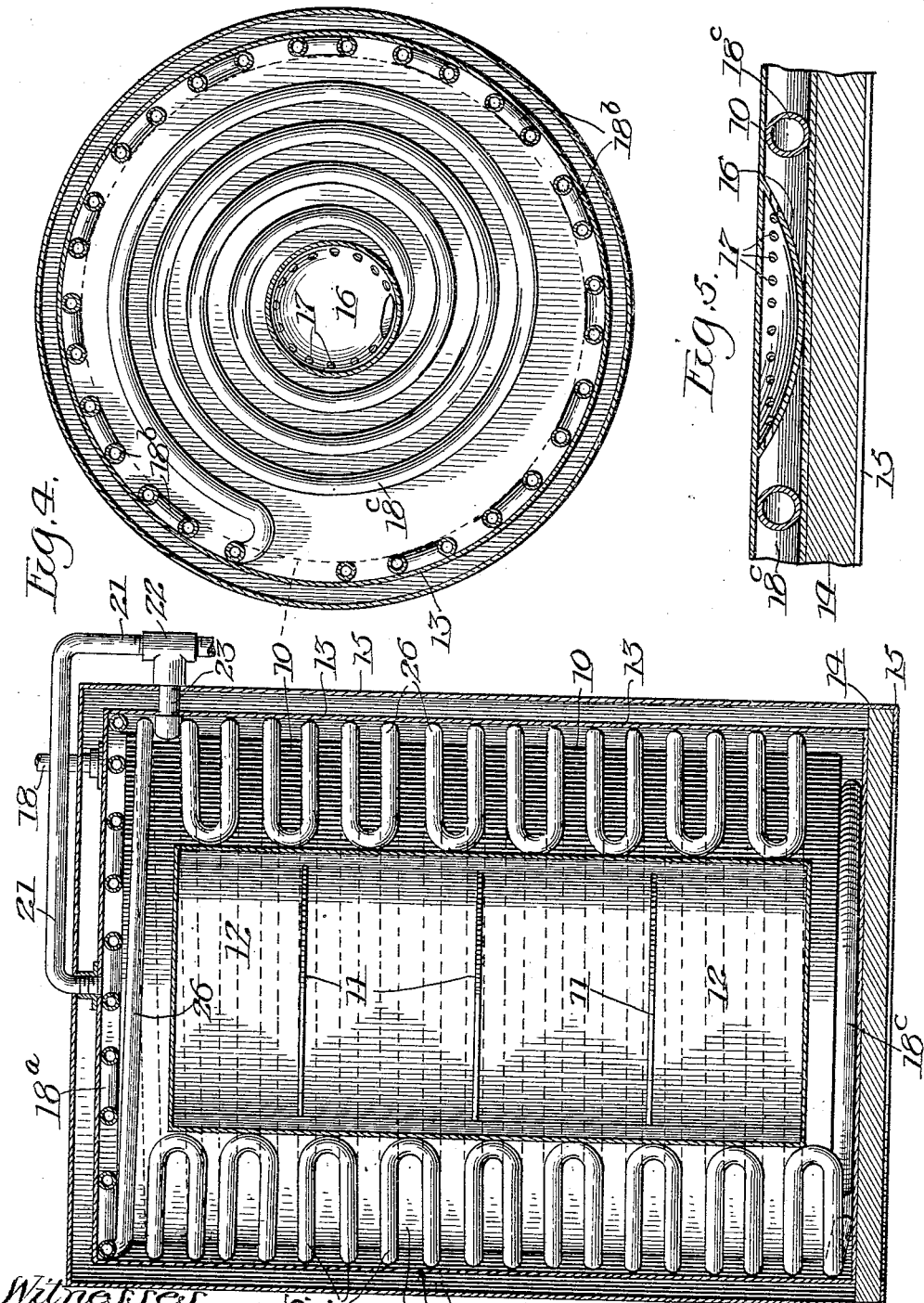

HENRY J. KUCK, OF CHICAGO, ILLINOIS.

COOLING-BOX.

941,077.  Specification of Letters Patent.  Patented Nov. 23, 1909.

Application filed September 14, 1908. Serial No. 452,848.

*To all whom it may concern:*

Be it known that I, HENRY J. KUCK, a citizen of the United States, residing at Chicago, in the county of Cook and State of Illinois, have invented certain new and useful Improvements in Cooling-Boxes, of which the following is a specification.

This invention relates to improvements in a cooling-box or receptacle to be used for receiving and maintaining, at a low degree of temperature, articles of food, such as meat, vegetables, milk and other edibles, to the end that they may be preserved for a considerable length of time or until required for use; and, it consists in certain peculiarities of the construction, novel arrangement, and operation of the various parts thereof, as will be hereinafter more fully set forth and specifically claimed.

The principal object of the invention is to provide a cooling-box or receptacle which shall be simple and inexpensive in construction, compact in form, and so made that water may be caused to circulate entirely around the compartment containing receptacle or box, with the exception of the front or door portion thereof.

Another object of the invention is to so construct the apparatus that the coils or pipes through which the water is first passed in its circulation will be submerged by the water flowing therefrom, thus utilizing the fresh supply and cooler water for abstracting the heat from the discharged liquid which submerges said coils and pipes.

A further object of the invention is to provide simple and efficient means for automatically ventilating the compartment containing or inner receptacle.

Other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1 is a plan view of a cooling-box or receptacle embodying one form of the invention, showing the top of the outer casing removed and a portion of the top of the water-jacket broken away in order to disclose the disposition and arrangement of parts of the water circulating pipe or coils; Fig. 2 is a central vertical sectional view thereof; Fig. 3 is an enlarged view partly in section and partly in elevation of a portion of the outlet pipe and ventilator for the compartment containing receptacle; Fig. 4 is a horizontal sectional view taken on line 4—4 of Fig. 2; Fig. 5 is an enlarged vertical sectional view of the lower portion of the cooling-box or receptacle, showing the means for distributing the cooling agent or liquid at the bottom of the compartment receptacle; and Fig. 6 is a vertical view partly in section and partly in elevation, illustrating a modification in the construction or arrangement of the pipe or coils for the circulation of water.

Like numerals of reference, refer to corresponding parts throughout the different views of the drawings.

The cooling-box or receptacle may be made of any suitable size, form and material, but is herein shown as being cylindrical in shape and consisting of an inner receptacle 10 having a series of horizontally disposed shelves 11 on which the articles to be kept cool may be supported and dividing the said receptacle into a series of compartments 12 of any suitable size. Surrounding the inner receptacle 10 at a slight distance therefrom is a jacket 13 which rests at its bottom on a base 14, preferably of wood, which is located in the bottom of a casing 15 which surrounds the jacket 13 at a distance therefrom, except at its bottom. The casing 15 is not absolutely essential to the invention, but it is preferable to use the same, as the space between it and the jacket 13 will form an air chamber and prevent moisture collecting on the outer surface of the jacket. Located on the central portion of the bottom of the receptacle 10 is a liquid distributer 16 which is in the form of a basin and has near its upper edge a series of openings 17 through which the water or liquid discharged from the circulating pipe or coils will be caused to pass. Extended through the top of the jacket 13 and of the casing 15, when the same is used, and near the wall thereof, is a pipe 18 which leads from a supply of water or other cooling agent under pressure into the space between the top of the jacket 13 and the top of the receptacle 10, which latter receptacle, as well as the jacket 13, is provided with a door-way 19 which is opened and closed by means of a door 20 hinged to one side of a correspondingly shaped door-way in the casing 15, when the same is employed. As shown by dotted lines in Fig. 1 and continuous lines in Figs. 2 and 4, the pipe 18 is extended horizontally on the upper surface of the receptacle 10 back and forth to form what may be termed a serpentine coil 18$^a$.

At a suitable point from the inlet portion of the pipe 18, usually diametrically opposite said portion, the said pipe is extended vertically back and forth around the wall of the receptacle 10 and within the jacket 13, except within front of the door 19, to form a serpentine coil 18$^b$ similar to that shown in Fig. 1, but disposed vertically. Leading from the lower end of the vertical coil 18$^b$ is a continuation of the pipe 18, which is formed into a spiral coil 18$^c$ located horizontally between the bottom of the receptacle 10 and the bottom of the jacket 13, as will be readily understood by reference to Figs. 2 and 4 of the drawings. The free end of the coil 18$^c$ of the water pipe 18 opens into the distributer 16 so that when the water is discharged from said pipe and its coils it will be distributed uniformly at the center of the bottom of the receptacle 10, to the end that it will gradually fill the space between the receptacle 10 and jacket 13 and overflow through the outlet pipe 21 which communicates at one of its ends through the casing 15 and jacket 13 with the space between said jacket and the receptacle 10, and is extended to one side of the receptacle and then downwardly to any suitable point for discharge. Located on the outlet pipe 21 at a suitable distance below the top of the receptacle 10 is a T-coupling 22 which has communication through a pipe section 23 inserted through suitable openings 24 in the casing, jacket and inner receptacle, with the upper portion of said receptacle, for the purpose of providing ventilation thereto, so that odors and vapors may be exhausted therefrom. The coupling 22 is provided above the pipe section 24 with an inwardly and downwardly extended deflector 25 from which the water, when being discharged from the jacket 13, will fall and be deflected from said pipe section in its descent.

It will be evident from the above description that the device is susceptible of considerable modification without material departure from the principle and spirit of the invention, and for this reason I do not desire to be understood as limiting myself to the precise form and arrangement of the several parts of the device as herein set forth in carrying out my invention in practice. For example, in some cases the construction shown in Fig. 6 may be employed with advantage. In this form of the cooler the construction is very similar to that above described, except that the circulating pipe 18 for the water or cooling agent may be disposed in horizontally inclined coils 26 around the closed portion of the inner receptacle 10 and between it and the jacket 13, instead of being vertically disposed as shown in Figs. 2 and 4 and just above described. When this modified construction is employed that portion of the pipe 18 on top of the receptacle 10 may be horizontally disposed in a serpentine coil 18$^a$, as in the other construction, and that portion of said pipe below the bottom of the receptacle 10 may be disposed in a spiral coil 18$^c$, with its free end discharging into a distributer, as in the first above described construction.

While I have shown two forms only of the coils of the circulating pipe which is deemed sufficient to disclose the broad idea of my invention, yet I wish it understood that I may dispose the various portions of the liquid circulating pipe between the jacket and compartment containing or inner receptacle 10 in many different ways without departing from the spirit of the invention, yet so as to cause the water or cooling agent to circulate through said pipe around the major part of the inner receptacle, as well as its top and bottom, and to discharge at the bottom of said receptacle so that the space between the jacket and receptacle 10 will be filled with the discharged water, and the latter forced out through the outlet pipe 21, in which operation it is apparent that as the water passes downwardly from the deflector 25 and through the opening in the partition 27 a suction will be created which will cause the odors and vapors to be exhausted from the compartment containing or inner receptacle and discharged with the waste water.

Having thus fully described my invention, what I claim as new, and desire to secure by Letters-Patent, is—

1. In a cooling-box, the combination with an inner receptacle, of a jacket surrounding the same and spaced therefrom, a pipe for the circulation of a cooling agent disposed between the walls, tops and bottoms of the receptacle and jacket and having its discharging end located at the bottom of the receptacle, an outlet pipe communicating with the upper portion of the space between the inner receptacle and jacket and extended downwardly at the exterior of the latter, a pipe section communicating at one of its ends with the upper portion of the inner receptacle and at its other end with the outlet pipe, and a downwardly inclined deflector pipe located in the outlet pipe above the juncture of the pipe section therewith.

2. In a cooling-box, the combination with an inner receptacle, of a jacket surrounding the same and spaced therefrom, a pipe for the circulation of a cooling agent disposed in ranges or coils between the walls, tops and bottoms of the receptacle and jacket and having its discharging end located at the bottom of the receptacle, an outlet pipe communicating with the upper portion of the space between the inner receptacle and jacket and extended downwardly at the exterior of the latter and having communication in its downward portion with the upper part of the inner receptacle, and a downwardly inclined deflector located in the outlet pipe.

3. In a cooling-box, the combination with an inner receptacle, of a jacket surrounding the same and spaced therefrom, a pipe for the circulation of a cooling agent disposed between the receptacle and jacket and having its discharging end located at about the center of the bottom of the receptacle, an outlet pipe communicating with the upper portion of the space between the inner receptacle and jacket and extended downwardly of the exterior of the latter, a T-coupling mounted on the depending portion of the outlet pipe and having a downwardly inclined deflector, and a pipe section communicating at one of its ends with said coupling below said deflector and at its other end with the upper portion of the inner receptacle.

HENRY J. KUCK.

Witnesses:
   CHAS. C. TILLMAN,
   M. A. NYMAN.